(12) United States Patent
Kim

(10) Patent No.: US 10,696,138 B2
(45) Date of Patent: Jun. 30, 2020

(54) CONTROL APPARATUS AND METHOD FOR COMPRESSOR OF VEHICLE

(71) Applicant: Hyundai Motor Company, Seoul (KR)

(72) Inventor: Yeong Jun Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 224 days.

(21) Appl. No.: 15/251,348

(22) Filed: Aug. 30, 2016

(65) Prior Publication Data

US 2017/0158024 A1 Jun. 8, 2017

(30) Foreign Application Priority Data

Dec. 3, 2015 (KR) .......................... 10-2015-0171744

(51) Int. Cl.
*B60H 1/00* (2006.01)
*B60H 1/32* (2006.01)

(52) U.S. Cl.
CPC ..... *B60H 1/00978* (2013.01); *B60H 1/00907* (2013.01); *B60H 1/3225* (2013.01); *B60H 2001/325* (2013.01); *B60H 2001/3257* (2013.01)

(58) Field of Classification Search
CPC .............. B60H 1/3225; B60H 1/00978; B60H 1/00907; B60H 2001/325; B60H 2001/3257; F25B 2400/16; F28D 9/0093
See application file for complete search history.

(56) References Cited

U.S. PATENT DOCUMENTS

| | | | | |
|---|---|---|---|---|
| 5,133,302 A * | 7/1992 | Yamada | ............... | B60H 1/3208 123/41.12 |
| 7,165,411 B2 * | 1/2007 | Eisenhour | ............ | B60H 1/3208 62/228.3 |
| 7,275,378 B2 * | 10/2007 | Errington | ........... | B60H 1/00764 62/133 |
| 7,398,653 B2 * | 7/2008 | Oomura | ............... | B60H 1/3214 62/228.1 |
| 9,170,570 B2 * | 10/2015 | Kawamoto | ............. | F01P 7/048 |
| 2011/0132014 A1 * | 6/2011 | Eisenhour | ............ | B60H 1/3216 62/228.1 |

(Continued)

FOREIGN PATENT DOCUMENTS

| JP | 07-096737 A | 4/1995 |
|---|---|---|
| JP | 08-244448 | 9/1996 |

(Continued)

OTHER PUBLICATIONS

JP 07096737 A MT (Year: 1995).*

*Primary Examiner* — Gordon A Jones
(74) *Attorney, Agent, or Firm* — Mintz Levin Cohn Ferris Glovsky and Popeo, P.C.; Peter F. Corless

(57) ABSTRACT

A control apparatus for a compressor of a vehicle capable of turning-on/off a compressor based on coolant pressure of an air conditioner in the winter and a method thereof are provided. The control apparatus includes a compressor that is configured to reduce a temperature by compressing a coolant of an air conditioner and a controller that is configured to operate the compressor, to confirm an operation coolant pressure of the air conditioner after operating the compressor. The controller also operates the compressor based on the operation coolant pressure of a measured coolant pressure of the air conditioner when an ambient temperature of the vehicle is less than a reference temperature.

7 Claims, 4 Drawing Sheets

(56) References Cited

U.S. PATENT DOCUMENTS

2016/0129755 A1* 5/2016 Yoshioka ........... B60H 1/00764
   701/36
2017/0159982 A1* 6/2017 West ................... F25B 49/02

FOREIGN PATENT DOCUMENTS

| JP | 2002-205539 A | 7/2002 |
| KR | 10-0633887 B1 | 10/2006 |

* cited by examiner

| Air conditioner switch | Coolant temperature(℃) 310 | | | | |
|---|---|---|---|---|---|
| | -30 | 95 | 100 | 105 | |
| OFF | OFF | | | | HIGH |
| | OFF | | | | HIGH |
| | OFF | | | | HIGH |

320

CONTROL APPARATUS AND METHOD FOR COMPRESSOR OF VEHICLE

CROSS-REFERENCE TO RELATED APPLICATION

This application claims priority to and the benefit of Korean Patent Application No. 10-2015-0171744 filed in the Korean Intellectual Property Office on Dec. 3, 2015, the entire contents of which are incorporated herein by reference.

BACKGROUND (a) Field of the Invention

The present invention relates to a control apparatus for a compressor of a vehicle, and more particularly, to a control apparatus for a compressor of a vehicle capable of turning-on/off a compressor based on coolant pressure of an air conditioner during cold temperature conditions and a method thereof.

(b) Description of the Related Art

In general, substantial heat is generated in an engine of a vehicle. When the heat is increased higher than a predetermined temperature, there is a danger of explosion. Accordingly, the temperature is reduced by circulating a coolant within the engine compartment. The heated coolant is radiated by a radiator. Additionally, to increase a radiating effect of the radiator, a cooling fan is installed in an engine compartment of a vehicle. Such a cooling fan may prevent overheating of the engine and represent an optimal performance of the engine by maintaining a temperature of the coolant in an appropriate condition. The cooling fan is operated by a motor.

In the winter, that is, during cold weather conditions, the cooling fan is not generally operated, but an air conditioner switch is switched in a heating and indoor cycling mode. In an idle leaving condition, coolant pressure of the air conditioner is significantly increased. When the coolant pressure is increased, to protect configuration components of a compressor in the air conditioner, a cooling fan is operated. However, when the cooling fan freezes, the cooling fan is not operated and thus, a fan motor may be damaged.

The above information disclosed in this section is merely for enhancement of understanding of the background of the invention and therefore it may contain information that does not form the prior art that is already known in this country to a person of ordinary skill in the art.

SUMMARY

The present invention provides a control apparatus for a compressor of a vehicle and a method thereof having advantages of turning-on/off a compressor based on coolant pressure of an air conditioner in the winter when the coolant pressure of an air conditioner is increased. Further, an exemplary embodiment of the present invention provides a control apparatus for a compressor of a vehicle for operating a cooling fan when an engine is over-heated and a method thereof.

An exemplary embodiment of the present invention provides a control apparatus for a compressor of a vehicle that may include: a compressor configured to reduce a temperature by compressing a coolant of an air conditioner; and a controller configured to operate the compressor, to detect an operation coolant pressure of the air conditioner after operating the compressor, and operate the compressor based on the operation coolant pressure of a measured coolant pressure of the air conditioner when an ambient temperature of the vehicle is less than a reference temperature. Further, the controller may be configured to stop an operation of the compressor when the operation coolant pressure of the air conditioner is increased to a first preset pressure after operating the compressor, and operate the compressor when the operation coolant pressure of the air conditioner is reduced to a second preset pressure after stopping the operation of the compressor.

The control apparatus for a compressor of a vehicle may further include: a cooling fan operated based on a coolant temperature, wherein the controller may be configured to operate the cooling fan when the coolant temperature is greater than a highest temperature. The control apparatus may further include a state detector including at least one of an intake air temperature measuring unit configured to measure an intake air temperature, a pressure measuring unit configured to a coolant pressure of the air conditioner, and a coolant temperature measuring unit configured to measure a coolant temperature.

Another exemplary embodiment of the present invention provides a control method for a compressor of a vehicle that may include: determining whether an ambient temperature of the vehicle is less than a reference temperature; measuring a coolant pressure of an air conditioner to confirm the measured coolant pressure when the ambient temperature of the vehicle is less than the reference temperature; determining whether the measured coolant pressure is equal to or greater than a reference pressure; turning-on a compressor of the air conditioner when the measured coolant pressure is equal to or greater than the reference pressure; measuring the coolant pressure of the air conditioner to confirm an operation coolant pressure; and turning-on or turning-off the compressor based on the operation coolant pressure.

An exemplary embodiment of the present invention may turn-on/off a compressor based on coolant pressure of an air conditioner in the winter when the coolant pressure of an air conditioner is increased to prevent configuration components of the compressor from being damaged. In addition, when the engine is overheated, a cooling fan may be operated to prevent a fan motor from being damaged.

Other various effects may be directly or indirectly disclosed in the following description of the embodiment of the present invention. That is, other various effects may be disclosed in a detailed description to be described below according to an exemplary embodiment of the present invention.

BRIEF DESCRIPTION OF THE DRAWINGS

These and/or other aspects of the invention will become apparent and more readily appreciated from the following description of the exemplary embodiments, taken in conjunction with the accompanying drawings of which:

FIG. 3 is an exemplary diagram illustrating a method of operating a cooling fan in the control method for a compressor of a vehicle according to an exemplary embodiment of the present invention.

DESCRIPTION OF SYMBOLS

Figure 1:
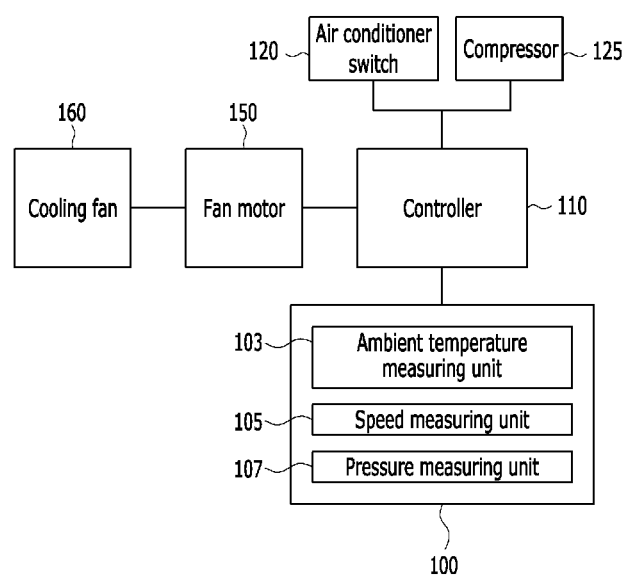
FIG. 1 is a block diagram illustrating a control apparatus for a compressor of a vehicle according to an exemplary embodiment of the present invention.

- 50: control apparatus for compressor of vehicle
- 100: state detector
- 110: controller
- 120: air conditioner switch
- 125: compressor
- 150: fan motor
- 160: cooling fan

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Furthermore, control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Hereinafter, an operation principle of a control method for a compressor of a vehicle and a method thereof according to the exemplary embodiment of the present invention will be described with reference to the accompanying drawings. However, following shown drawings and detailed description relate to one of various exemplary embodiments to efficiently describe characteristics of the present invention. Accordingly, the present invention is not limited to following drawings and description.

In the following description, when detailed description about well-known functions or configurations may make the subject matter of the disclosure unclear, the detailed description will be omitted. The terms are defined by taking into consideration functions of the present invention, which may be changed according to the intentions and practices of users or operators. Accordingly, the terms should be determined based on throughout the specification in the present invention. Further, to efficiently describe technical characteristics of the present invention, the exemplary embodiment may suitably modify, integrate, or divide terms that can be commonly apprehended by those skilled in the art. However, the present invention is not limited thereby.

Hereinafter, exemplary embodiments will be described in more detail with reference to accompanying drawings. FIG. 1 is a block diagram illustrating a control apparatus for a compressor of a vehicle according to an exemplary embodiment of the present invention. Referring to FIG. 1, a control apparatus 50 for a compressor of a vehicle may include a state detector 100, a controller 110, an air conditioner switch 120, a compressor 125, a fan motor 150, and a cooling fan 160.

The state detector 100 may be configured to detect information necessary to operate the compressor 125. The state detector 100 may include an ambient measuring unit 103, a pressure measuring unit 105, and a coolant temperature measuring unit 107. The various units may be sensors operated by the controller 110. In particular, the ambient measuring unit 103 may be configured to measure an ambient temperature, that is, an outside temperature of the vehicle. The ambient measuring unit 103 may be configured to provide the measured ambient temperature to the controller 110. The pressure measuring unit 105 may be configured to measure coolant pressure of an air conditioner to provide the measured coolant pressure thereof to the controller 110. The coolant temperature measuring unit 107 may be configured to measure a temperature of coolant to provide the measured temperature of the coolant to the controller 110.

The controller 110 may be configured to operate the state detector 100, the air conditioner switch 120, the compressor 125, the fan motor 150, and the cooling fan 160 to operate the compressor 125. In particular, the controller 110 may be configured to determine whether the measured coolant pressure is equal to or greater than a reference pressure when the ambient temperature of the vehicle is less than a reference temperature. When the measured coolant pressure of the air conditioner is equal to or greater than the reference pressure, the controller 110 may be configured to operate the compressor 125. The controller 110 may further be configured to operate the compressor 125 and then operate the compressor 125 or stop the operation of the compressor 125 based on operation coolant pressure of the conditioner. Accordingly, moisture on a window may be removed without operation of the cooling fan 160 and configuration components of the compressor 125 may be prevented from being damaged.

Furthermore, the controller 110 may be configured to confirm the coolant temperature. When the coolant temperature exceeds the highest temperature, the controller 110 may be configured to output an operation signal to the fan motor 150 for operating the cooling fan 160. For example, the controller 110 may be configured to output the operation signal to the fan motor 150 disposed at a blower assembly (not shown) via a relay (not shown) and a connector (not shown). In particular, the fan motor 150 may be operated based on the operation signal output or transmitted from the controller 110.

A method of operating the compressor 125 by the controller 110 will be described in detail with reference to FIG. 2 to FIG. 5. For the purpose, the controller 110 may be realized by at least one processor according to a predetermined program, and the predetermined program may be configured to perform respective steps of the control method for a compressor of a vehicle according to an exemplary embodiment of the present invention.

Moreover, the air conditioner switch 120 may be configured to turn an air conditioner on or off. In other words, the air conditioner switch 120 may be configured to turn the air conditioner on or off by a driver or the controller 110. The compressor 125 may be configured to operate the air conditioner by compressing the coolant included in the air conditioner with high temperature and high pressure. The compressor 125 may be turned-on/off by the controller 110. The fan motor 150 may be configured to operate the cooling fan 160 under the control of the controller 110. The fan motor 150 may be directly connected to the cooling fan 160. The cooling fan 160 may be operated by the fan motor 150. Additionally, the cooling fan 160 may be operated to prevent overheating of an engine when the temperature of the coolant exceeds the highest temperature under the control of the controller 110.

Figure 2:
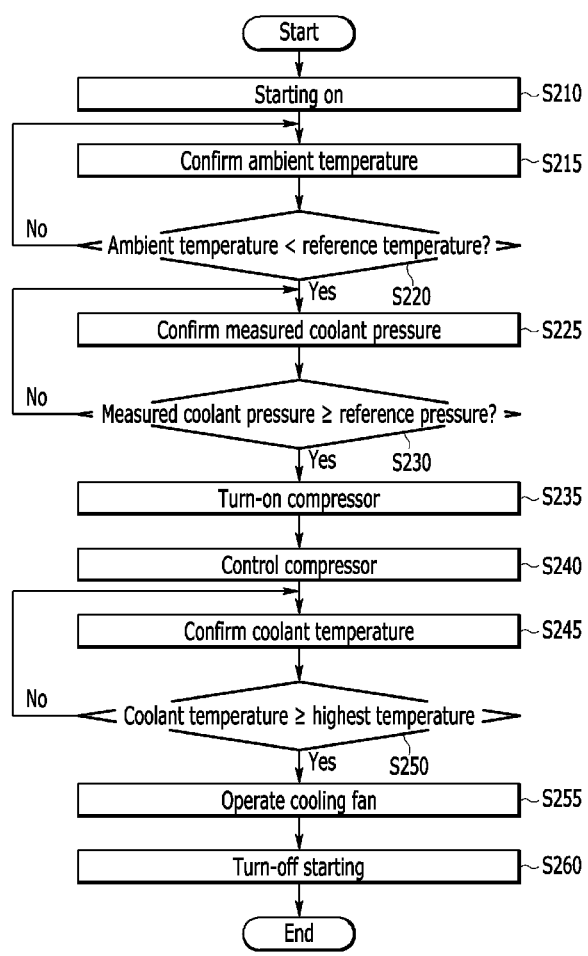
FIG. 2 is a flowchart illustrating a control method for a compressor of a vehicle according to an exemplary embodiment of the present invention.

Hereinafter, a method of controlling a compressor in a vehicle will be described with reference to FIG. 2 to FIG. 5. FIG. 2 is a flowchart illustrating a control method for a compressor of a vehicle according to an exemplary embodiment of the present invention. Referring to FIG. 2, a controller 110 may be configured to determine whether starting is turned-on (S210). In particular, the controller 110 may be configured to receive a starting on signal from an ignition detector (not shown) to determine whether the starting is turned-on.

Additionally, the controller 110 may be configured to confirm an ambient temperature (S215). In other words, the controller 110 may be configured to receive and confirm the ambient temperature from the ambient measuring unit 103. The controller 110 may then be configured to determine whether the ambient temperature is less than the reference temperature (S220). Particularly, the reference temperature represents a reference temperature to determine whether a current season is the winter (e.g., colder weather conditions), and may be set by a worker or may be set by a preset algorithm (e.g., program and probability model). For example, the reference temperature may be about 3° C.

Meanwhile, when the ambient temperature is equal to or greater than the reference temperature, due to the colder weather conditions, the controller 110 may be configured to operate the cooling fan 160 by adjusting the high speed and low speed of the motor 150 based on coolant pressure of an air conditioner, vehicle speed and a coolant temperature according to the related art. The controller 110 may be configured to confirm the measured coolant pressure of the air conditioner (S225). In other words, the controller 110 may be configured to receive and confirm the measured coolant pressure obtained by measuring the coolant pressure of the air conditioner from the pressure measuring unit 105.

The controller 110 may be configured to determine whether the measured coolant pressure is equal to or greater than the reference pressure (S230). In particular, the reference pressure represents a coolant pressure for operating the compressor 125, and may be set by a worker or may be set by a preset algorithm (e.g., program and probability model). Meanwhile, when the measured coolant pressure is less than the reference pressure, the controller 110 may return to step S225 to confirm the measured coolant pressure of the air conditioner.

When the measured coolant pressure is equal to or greater than the reference pressure, the controller 110 may be configured to turn on the compressor 125 (S235). In other words, when the measured coolant pressure is equal to or greater than the reference pressure, the controller 110 may be configured to turn-on the compressor 125 to operate the air conditioner. The controller 110 may further be configured to operate the compressor 125 and then operate the compressor 125 based on operation coolant pressure (S240). A method of controlling a compressor according to operation coolant pressure will be described with reference to FIG. 4 and FIG. 5.

The controller 110 may be configured to confirm a coolant temperature (S245). In particular, the controller 110 may be configured to receive and confirm coolant temperature from a water temperature measuring unit 107 to operate the cooling fan 160. The controller 110 may be configured to determine whether the coolant temperature is equal to or greater than the highest temperature (S250). In particular, the highest temperature represents a reference temperature to determine whether overheating occurs in the engine, and may be set by a worker or may be set by a preset algorithm (e.g., program and probability model). For example, as shown in FIG. 3, the highest temperature 310 may be about 105° C.

Meanwhile, when the coolant temperature is less than the highest temperature, the controller 110 may return to step S245 to monitor the coolant temperature. When the coolant temperature is equal to or greater than the highest temperature, the controller 110 may be configured to operate the cooling fan 160 (S255). Additionally, the controller 110 may be configured to generate an operation signal for operating the cooling fan 160 to provide the generated operation signal to the fan motor 150, and operate the cooling fan 160 using a fan motor 150 to operate the cooling fan 160. For example, the controller 110 may use a control logic 300 when an air conditioner switch 120 is turned-off regardless of on/off of the air conditioner switch 120 as shown in FIG. 3 to operate the cooling fan 160.

Particularly, the operation signal may be a high speed signal 320 for operating the fan motor 150 at a high speed as shown in FIG. 3. Accordingly, since the cooling fan 160 may be operated at the high speed to reduce the temperature of the engine, overheating of the engine may be prevented. The controller 110 may be configured to confirm whether the starting is turned-off (S260). In other words, the controller 110 may be configured to receive a starting off signal from an ignition detector to determine whether the starting is turned-off.

Figure 4:
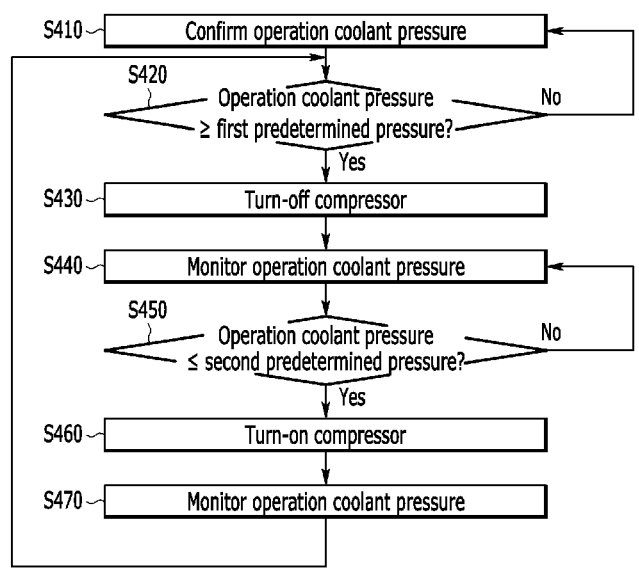
FIG. 4 is a flowchart illustrating a control method for a compressor of a vehicle according to an exemplary embodiment of the present invention.

FIG. 4 is a flowchart illustrating a control method for a compressor of a vehicle according to an exemplary embodiment of the present invention. Referring to FIG. 4, the controller 110 may be configured to operate the compressor 125 and then confirm operation coolant pressure of an air conditioner (S410). In other words, the controller 110 may be configured to operate the compressor 125 and then receive operation coolant pressure from a pressure measuring unit 105 to confirm the operation coolant pressure.

Additionally, the controller 110 may be configured to determine whether the operation coolant pressure is equal to or greater than a first preset pressure (S420). The controller 110 may be configured to monitor the operation coolant pressure, and determine whether the operation coolant pressure is increased to the first preset pressure. The first preset pressure may represent a reference coolant pressure of an air conditioner to stop an operation of the compressor 125. The first preset pressure may be set by a worker or may be set by a preset algorithm (e.g., program and probability model). For example, the first preset pressure may be about 14.5 kg/cm$^2$G.

The controller 110 may be configured to turn off the compressor 125 when the operation coolant pressure is equal to or greater than the first preset pressure (S430). In other words, the controller 110 may be configured to stop an operation of the compressor 125 when the operation coolant pressure is increased to the first preset pressure. The controller 110 may be configured to stop the operation of the compressor 125 and monitor the operation coolant pressure of an air conditioner (S440).

Further, the controller 110 may be configured to determine whether the operation coolant pressure monitored in step S440 is less than or equal to a second preset pressure (S450). In particular, the controller 110 may be configured to turn off the compressor 125 and then determine whether the operation coolant pressure is reduced to the second preset pressure. The second preset pressure may represent a reference coolant pressure of the air conditioner for operating the compressor 125, and may be set by a worker or may be set by a preset algorithm (e.g., program and probability model). For example, the second predetermined pressure may be about 6 kg/cm$^2$G.

The controller 110 may be configured to turn on the compressor 125 when the operation coolant pressure is less than or equal to the second preset pressure (S460). In particular, the controller 110 may be configured to operate the compressor 125 when the operation coolant pressure is reduced to the second preset pressure. The controller 110 may be configured to operate the compressor 125 and then monitor the operation coolant pressure of the air conditioner (S470). The controller 110 may repeat step S420 to step S470 when the ambient temperature is equal to or greater than the reference temperature or until the starting is turned-off.

As described above, when coolant pressure of the air conditioner is increased during colder weather conditions, the control apparatus 50 for a compressor of a vehicle according to the present invention may prevent configuration components of the compressor 125 from being damaged by operation the compressor 125 without operation the cooling fan 160, and may be operated when the cooling fan 160 is in a low temperature to prevent the fan motor 150 from being damaged. In addition, the control apparatus 50 for a compressor of a vehicle according to the present invention may remove humidity on a window using the compressor 125.

While this invention has been described in connection with what is presently considered to be exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. A control apparatus for a compressor of a vehicle, comprising:
    the compressor configured to reduce a temperature by compressing a coolant of an air conditioner;
    a controller configured to operate the compressor, confirm an operation coolant pressure of the air conditioner after operating the compressor, and operate the compressor based on the operation coolant pressure of a measured pressure of the coolant of the air conditioner in response to determining that an ambient temperature of the vehicle is less than a reference temperature; and
    a cooling fan operated based on a temperature of the coolant,
    wherein the controller is configured to operate the cooling fan both in response to determining that the temperature of the coolant exceeds a particular temperature and after an operation of the compressor based on the operation coolant pressure of the measured pressure of the coolant of the air conditioner in response to determining the ambient temperature of the vehicle is less than the reference temperature.

2. The control apparatus for the compressor of the vehicle of claim 1, wherein the controller is configured to stop an operation of the compressor when the operation coolant pressure of the air conditioner is increased to a first preset pressure after operating the compressor, and operate the compressor when the operation coolant pressure of the air conditioner is reduced to a second preset pressure after stopping the operation of the compressor.

3. The control apparatus for the compressor of the vehicle of claim 1, further comprising:
    a state detector including at least one selected from the group consisting of: an intake air temperature measuring unit configured to measure an intake air temperature, a pressure measuring unit configured to measure the pressure of the coolant of the air conditioner, and a coolant temperature measuring unit configured to measure the temperature of the coolant.

4. A control method for a compressor of a vehicle, comprising:
    determining, by a controller, whether an ambient temperature of the vehicle is less than a reference temperature;
    measuring, by the controller, a pressure of a coolant of an air conditioner to confirm the coolant pressure in response to determining that the ambient temperature of the vehicle is less than the reference temperature;
    determining, by the controller, whether the pressure of the coolant is equal to or greater than a reference pressure;
    turning-on, by the controller, the compressor of the air conditioner in response to determining that the pressure of the coolant is equal to or greater than the reference pressure;
    measuring, by the controller, the pressure of the coolant of the air conditioner to confirm an operation coolant pressure;
    turning-on or turning-off, by the controller, the compressor based on the operation coolant pressure; and
    operating, by the controller, a cooling fan both in response to determining that a temperature of the coolant exceeds a particular temperature and after an operation of the compressor based on the operation coolant pressure of the measured pressure of the coolant of the air conditioner in response to determining that the ambient temperature of the vehicle is less than the reference temperature.

5. The control method for the compressor of the vehicle of claim 4, wherein the turning-on or turning-off of the compressor according to the operation coolant pressure includes a process of:
- turning-off, by the controller, the compressor when the operation coolant pressure is equal to or greater than a first preset pressure;
- monitoring, by the controller, the operation coolant pressure of the air conditioner;
- turning-on, by the controller, the compressor when the monitored operation coolant pressure is less than or equal to a second preset pressure; and
- monitoring, by the controller, the operation coolant pressure of the air conditioner.

6. The control method for the compressor of the vehicle of claim 5, wherein the turning-on or turning-off of the compressor according to the operation coolant pressure includes:
- repeating the process of claim 5 when the ambient temperature is equal to or greater than a reference temperature until starting is turned-off.

7. The control method for the compressor of the vehicle of claim 4, wherein operating the cooling fan based on the temperature of the coolant includes:
- confirming, by the controller, the temperature of the coolant;
- determining, by the controller, whether the temperature of the coolant exceeds a particular temperature; and
- turning-on, by the controller, the cooling fan in response to determining that the temperature of the coolant exceeds a particular temperature.

* * * * *